United States Patent
Iwasa et al.

(10) Patent No.: US 10,240,672 B2
(45) Date of Patent: Mar. 26, 2019

(54) CONTROL DEVICE FOR CONTINUOUSLY VARIABLE TRANSMISSION AND METHOD FOR CONTROLLING THE SAME

(71) Applicants: JATCO Ltd, Fuji-shi, Shizuoka (JP); NISSAN MOTOR CO., LTD., Yokohama-shi, Kanagawa (JP)

(72) Inventors: Hiroki Iwasa, Atsugi (JP); Ryu Sungpil, Atsugi (JP); Hironori Miyaishi, Sagamihara (JP); Tetsuya Izumi, Ayase (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 15/558,840

(22) PCT Filed: Feb. 22, 2016

(86) PCT No.: PCT/JP2016/054998
§ 371 (c)(1),
(2) Date: Sep. 15, 2017

(87) PCT Pub. No.: WO2016/152353
PCT Pub. Date: Sep. 29, 2016

(65) Prior Publication Data
US 2018/0080550 A1 Mar. 22, 2018

(30) Foreign Application Priority Data
Mar. 23, 2015 (JP) .................................. 2015-059513

(51) Int. Cl.
*F16H 61/662* (2006.01)
*F16H 59/42* (2006.01)
(Continued)

(52) U.S. Cl.
CPC .......... *F16H 61/662* (2013.01); *F16H 59/42* (2013.01); *F16H 61/00* (2013.01); *F16H 59/18* (2013.01);
(Continued)

(58) Field of Classification Search
CPC . F16H 61/662; F16H 61/66; F16H 2061/0078
See application file for complete search history.

(56) References Cited

U.S. PATENT DOCUMENTS

| | | | |
|---|---|---|---|
| 8,002,654 B2 * | 8/2011 | Oshiumi | F16H 61/66272 474/28 |
| 8,226,507 B2 * | 7/2012 | Uchiyama | F16H 61/12 474/49 |
| 2013/0289841 A1 * | 10/2013 | Okudaira | F16H 61/66259 701/61 |

FOREIGN PATENT DOCUMENTS

JP 2011-127658 A 6/2011

* cited by examiner

*Primary Examiner* — Erin D Bishop
(74) *Attorney, Agent, or Firm* — Foley & Lardner LLP

(57) ABSTRACT

When a switch condition where a shift of a continuously variable transmission is switched from a first shift that is any one of an upshift and a downshift to another second shift is satisfied, an integral term in the feedback control of the first shift is reduced to zero with a first predetermined gradient, an operation of an integral term in the feedback control of the second shift is started after the switch condition is satisfied and before the integral term in the feedback control of the first shift reaches zero, and the continuously variable transmission is shifted based on a sum of the integral term in the feedback control of the first shift and the integral term in the feedback control of the second shift.

8 Claims, 7 Drawing Sheets

(51) Int. Cl.
  *F16H 61/00*    (2006.01)
  *F16H 59/18*    (2006.01)
  *F16H 59/44*    (2006.01)
(52) U.S. Cl.
  CPC ........ *F16H 59/44* (2013.01); *F16H 2059/186* (2013.01); *F16H 2061/0078* (2013.01)

CONTROL DEVICE FOR CONTINUOUSLY VARIABLE TRANSMISSION AND METHOD FOR CONTROLLING THE SAME

TECHNICAL FIELD

The present invention relates to control of a continuously variable transmission.

BACKGROUND ART

JP2011-127658A discloses a control device for a continuously variable transmission that resets an integral term used in feedback control at an upshift when the upshift is switched to a downshift.

SUMMARY OF INVENTION

In the above-described technique, after the integral term of the upshift is stepwisely reset, an operation of an integral term of the downshift starts.

This improves responsiveness that switches from the upshift to the downshift. However, the upshift is rapidly switched to the downshift, thus possibly providing uncomfortable feeling to a driver.

In contrast, in order to restrain the rapid switch from the upshift to the downshift, it is conceivable to gradually reduce the integral term of the upshift with a predetermined gradient.

However, when the integral term of the upshift is gradually reduced with the predetermined gradient, after the integral term of the upshift is reduced with the predetermined gradient to be reset, the integral term of the downshift is operated. Therefore, an operation start of the integral term of the downshift, that is, a start of the downshift gets delayed, thus decreasing the responsiveness that switches from the upshift to the downshift.

The present invention has been made to solve the problem, and an object of the present invention is to improve responsiveness in switching from an upshift to a downshift, or from the downshift to the upshift, and not to provide uncomfortable feeling to a driver in switching.

According to an aspect of the present invention, a control device for a continuously variable transmission that performs feedback control to control an operating state of the continuously variable transmission is provided. The control device includes a shift unit configured to, when a switch condition where a shift of the continuously variable transmission is switched from a first shift that is any one of an upshift and a downshift to another second shift is satisfied, reduce an integral term in the feedback control of the first shift to zero with a first predetermined gradient, start an operation of an integral term in the feedback control of the second shift after the switch condition is satisfied and before the integral term in the feedback control of the first shift reaches zero, and shift the continuously variable transmission based on a sum of the integral term in the feedback control of the first shift and the integral term in the feedback control of the second shift.

According to another aspect of the present invention, a control method of a continuously variable transmission that performs feedback control to control an operating state of the continuously variable transmission, is provided. The control method includes, when a switch condition where a shift of the continuously variable transmission is switched from a first shift that is any one of an upshift and a downshift to another second shift is satisfied, reducing an integral term in the feedback control of the first shift to zero with a first predetermined gradient; starting an operation of an integral term in the feedback control of the second shift after the switch condition is satisfied and before the integral term in the feedback control of the first shift reaches zero; and shifting the continuously variable transmission based on a sum of the integral term in the feedback control of the first shift and the integral term in the feedback control of the second shift.

According to these aspects, the integral term in the feedback control of the first shift gradually reduces with the first predetermined gradient, and the operation of the integral term in the feedback control of the second shift is started before the integral term in the feedback control of the first shift reaches zero. This improves the responsiveness of the second shift, and can restrain provision of the uncomfortable feeling to the driver in switching from the first shift to the second shift.

DESCRIPTION OF EMBODIMENTS

The following describes an embodiment of the present invention with reference to the accompanying drawings. It should be noted that, in the following description, a "speed ratio" of a transmission is a value obtained by dividing an input rotation speed of the transmission by an output rotation speed of the transmission. A "Lowest speed ratio" is a maximum speed ratio of the transmission used, for example, when a vehicle starts. A "Highest speed ratio" is a minimum speed ratio of the transmission. Changing to a Low side so as to increase the speed ratio is referred to as a downshift, and changing to a High side so as to decrease the speed ratio is referred to as an upshift.

Figure 1:
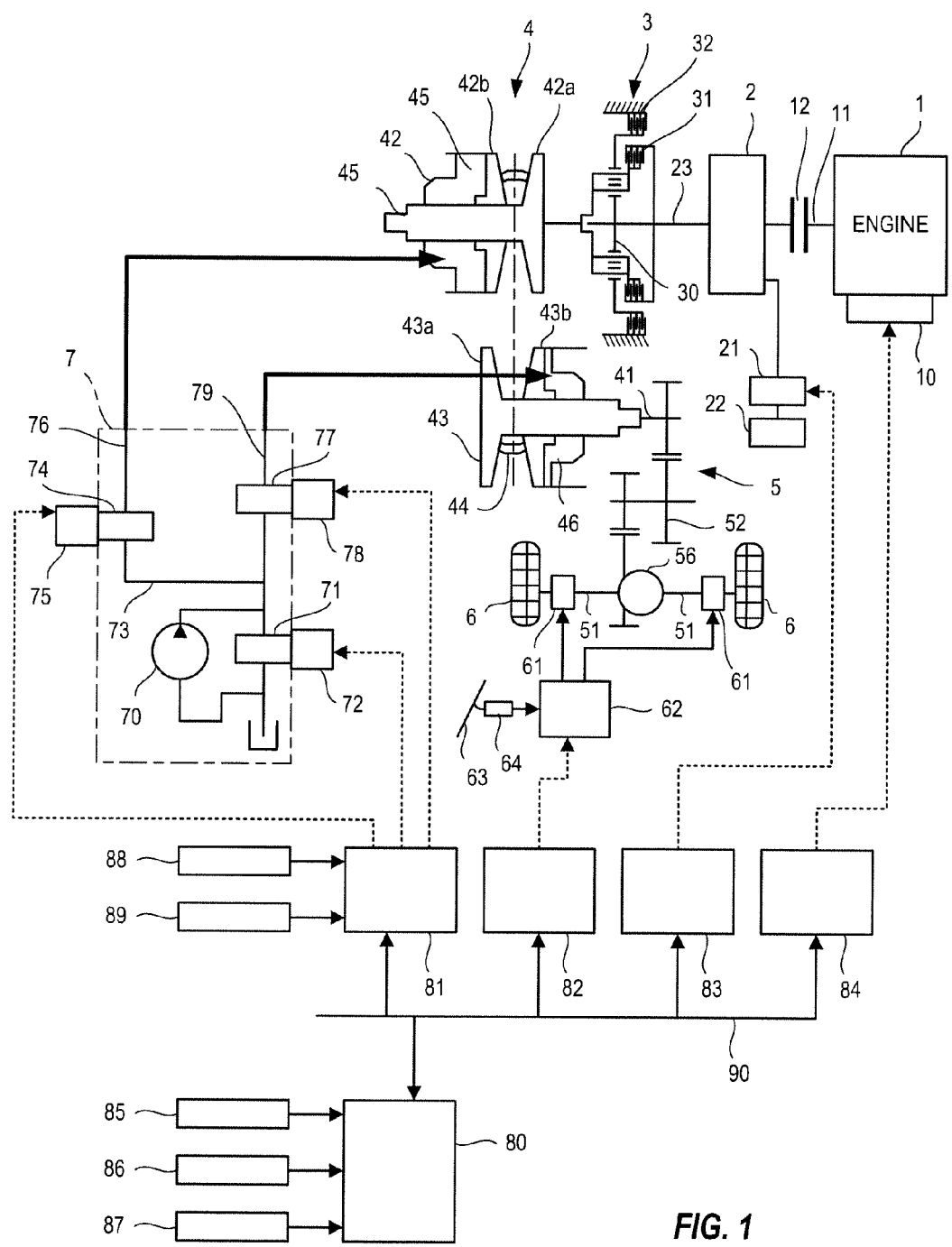
FIG. 1 is an explanatory view illustrating a configuration of a hybrid vehicle of the embodiment.

FIG. 1 is an explanatory view illustrating a configuration of a hybrid vehicle that includes a transmission 4 of the embodiment.

The vehicle includes an engine 1 and a motor-generator 2 as a driving source. An output rotation of the engine 1 or the motor-generator 2 is transmitted to driving wheels 6 via a forward/reverse switching mechanism 3, the transmission 4, and a final reduction mechanism 5.

The engine 1 includes an engine control actuator 10. The engine control actuator 10 operates the engine 1 with a desired torque based on a command from an engine control unit 84, which will be described later, to rotate an output shaft 11. Between the engine 1 and the motor-generator 2, a first clutch 12 is disposed. The first clutch 12 intermits rotation between the engine 1 and the motor-generator 2.

The motor-generator 2 is driven by electric power output from an inverter 21. Regenerative electric power of the motor-generator 2 is input to the inverter 21. The inverter 21 operates the motor-generator 2 with a desired torque based on a command from a motor control unit 83, which will be described later. The motor-generator 2 is, for example, constituted of a synchronous rotating electrical machine driven by three-phase current. The inverter 21 is coupled to a battery 22.

The forward/reverse switching mechanism 3 is disposed between the driving source formed of the engine 1 and the motor-generator 2, and the transmission 4. The forward/reverse switching mechanism 3 switches rotation input from an output shaft 23 in a forward rotation direction (forward running) or a reverse rotation direction (reverse running) to input the rotation to the transmission 4. The forward/reverse switching mechanism 3 includes a double-pinion-type planetary gear mechanism 30, a forward clutch 31, and a reverse brake 32. The forward/reverse switching mechanism 3 is switched in the forward rotation direction when the forward clutch 31 is engaged, and in the reverse rotation direction when the reverse brake 32 is engaged.

The planetary gear mechanism 30 is constituted of a sun gear to which the rotation of the driving source is input, a ring gear, and a carrier that supports pinion gears engaged with the sun gear and the ring gear. The forward clutch 31 is configured to integrally rotate the sun gear and the carrier when it is engaged. The reverse brake 32 is configured to stop rotation of the ring gear when it is engaged.

One of the forward clutch 31 and the reverse brake 32 of the forward/reverse switching mechanism 3 is configured as a second clutch that intermits the rotation between the engine 1 and the motor-generator 2, and the transmission 4.

The transmission 4 is constituted by bridging a belt 44 between a primary pulley 42 and a secondary pulley 43. The transmission 4 is a belt continuously variable transmission mechanism (variator) that changes a winding diameter of the belt 44 to shift, by changing respective groove widths of the primary pulley 42 and the secondary pulley 43.

The primary pulley 42 includes a fixed pulley 42a and a movable pulley 42b. The movable pulley 42b moves by primary hydraulic pressure supplied to a primary hydraulic chamber 45 to change the groove width of the primary pulley 42.

The secondary pulley 43 includes a fixed pulley 43a and a movable pulley 43b. The movable pulley 43b operates by secondary hydraulic pressure supplied to a secondary hydraulic chamber 46 to change the groove width of the secondary pulley 43.

The belt 44 is bridged between a sheave surface having a V shape formed of the fixed pulley 42a and the movable pulley 42b of the primary pulley 42 and a sheave surface having a V shape formed of the fixed pulley 43a and the movable pulley 43b of the secondary pulley 43.

The final reduction mechanism 5 transmits output rotation from a transmission output shaft 41 of the transmission 4 to the driving wheels 6. The final reduction mechanism 5 includes a plurality of gear trains 52 and a differential gear 56. Axle shafts 51 are coupled to the differential gear 56 to rotate the driving wheels 6.

The driving wheel 6 includes a brake 61. Braking force of the brake is controlled by a brake actuator 62 based on a command from a brake control unit 82, which will be described later. The brake actuator 62 controls braking force of the brake 61 based on a detection amount of a brake sensor 64 that detects a pedal force of a brake pedal 63. The brake actuator 62 may be a fluid pressure actuator. The brake sensor 64 transforms the pedal force of the brake pedal 63 into brake fluid pressure. Based on this brake fluid pressure, the brake actuator 62 may control the braking force of the brake 61.

Hydraulic pressure from a shift hydraulic control unit 7 is supplied to the primary pulley 42 and the secondary pulley 43 of the transmission 4.

The shift hydraulic control unit 7 includes a regulator valve 71 and a line pressure solenoid 72. The regulator valve 71 regulates hydraulic pressure generated by hydraulic oil (also used for lubricating oil) output from an oil pump 70 to a line pressure PL. The line pressure solenoid 72 operates the regulator valve 71. The line pressure PL is supplied to a first pressure regulating valve 74 and a second pressure regulating valve 77 by a line pressure oil passage 73. The first pressure regulating valve 74 is operated by a primary hydraulic pressure solenoid 75 to supply the primary hydraulic pressure to a primary pressure oil passage 76. The second pressure regulating valve 77 is operated by a secondary hydraulic pressure solenoid 78 to supply the secondary hydraulic pressure to a secondary pressure oil passage 79. The line pressure solenoid 72, the primary hydraulic pressure solenoid 75, and the secondary hydraulic pressure solenoid 78 operate corresponding to a command from a CVT control unit 81 to control the respective hydraulic pressures. The shift hydraulic control unit 7 also supplies the lubricating oil to the forward/reverse switching mechanism 3, the transmission 4, and the like.

The oil pump 70 is coupled to the output shaft 23 between the motor-generator 2 and the forward/reverse switching mechanism 3 via a sprocket, a chain, or the like. The rotation of the output shaft 23 is transmitted to drive the oil pump 70.

The CVT control unit 81, the brake control unit 82, the motor control unit 83, the engine control unit 84, and a hybrid control module 80, which will be described later, are communicatively coupled to one another via a CAN 90.

Signals from a primary rotation sensor 88, a secondary rotation sensor 89, and the like are input to the CVT control unit 81. The CVT control unit 81 transmits the command to the shift hydraulic control unit 7 based on the input signal. The hydraulic pressure of the shift hydraulic control unit 7 is also supplied to the transmission 4 and the forward/reverse switching mechanism 3. The CVT control unit 81 also controls the engagement states of the forward clutch 31 and the reverse brake 32 of the forward/reverse switching mechanism 3.

The hybrid control module 80 manages consumption energy of a whole vehicle. The hybrid control module 80 controls the energy consumption to enhance energy efficiency by controlling the driving of the engine 1 and the motor-generator 2.

Signals from an accelerator position sensor 85, a vehicle speed sensor 86, an inhibitor switch sensor 87, and the like and information from the respective control units via a CAN communication line are input to the hybrid control module 80. The hybrid control module 80 calculates a target driving torque and a target braking torque from these signals and information. A fluid pressure braking torque is a remain that regenerative braking torque portion, which is a maximum regenerative torque portion that can be generated in the motor-generator 2, is subtracted from the target braking torque. The target braking torque is obtained from a sum of the regenerative braking torque and the fluid pressure braking torque. The hybrid control module 80 performs regeneration at the motor-generator 2 in deceleration to recover the electric power.

The brake control unit 82 outputs a driving command to the brake actuator 62 based on a control command from the hybrid control module 80. The brake control unit 82 obtains information of the brake fluid pressure that is being generated in the brake actuator 62 to transmit the information to the hybrid control module 80.

The motor control unit 83 outputs a target power running command (a positive torque command) or a target regeneration command (a negative torque command) to the inverter 21 based on the control command from the hybrid control module 80. The motor control unit 83 detects an actual current value and the like applied to the motor-generator 2 to obtain actual motor driving torque information, thus transmitting the information to the hybrid control module 80.

The engine control unit 84 outputs the driving command to the engine control actuator 10 based on the control command from the hybrid control module 80. The engine control unit 84 transmits actual engine driving torque information obtained from a rotation speed, a fuel injection quantity, and the like of the engine 1 to the hybrid control module 80.

The hybrid control module 80 performs the control corresponding to the following modes.

The vehicle has an electric vehicle mode (hereinafter referred to as an "EV mode") and a hybrid vehicle mode (hereinafter referred to as a "HEV mode") as operation modes.

The "EV mode" is a mode where the first clutch 12 is in a disengagement state, and the driving source is only the motor-generator 2. The "EV mode" is selected, for example, when a request driving force is low, and a battery SOC (State of Charge) is sufficiently ensured.

The "HEV mode" is a mode where the first clutch 12 is in the engagement state, and the driving source is the engine 1 and the motor-generator 2. The "HEV mode" is selected, for example, when the request driving force is large, or when the battery SOC for driving the motor-generator 2 is insufficient.

In this embodiment, the CVT control unit 81 performs feedback control to control an operating state of the transmission 4. This changes an actual speed ratio ia of the transmission 4 so as to follow a target speed ratio it. As the feedback control, PID control is used. In the feedback control using the PID control, when the transmission 4 is switched from one upshift or downshift (a first shift) to another downshift or upshift (a second shift), for example, it is conceivable to gradually reduce an upside integral term Iup, which is a manipulated variable of an integrator in the feedback control at the upshift, to reset the upside integral term Iup to zero, and then to start an operation of a downside integral term Idown, which is a manipulated variable of an integrator in the feedback control at the downshift.

However, when the operation of the downside integral term Idown is started after the upside integral term Iup is gradually reduced to reset the upside integral term Iup to zero, the downshift is not performed from the start of the reduction of the upside integral term Iup to the start of the operation of the downside integral term Idown, thus making the responsiveness of the shift poor.

Alternatively, the upside integral term Iup may be step-wisely turned to zero to ensure the improvement of the responsiveness of the shift. However, in this case, the upshift is rapidly switched to the downshift, thus increasing shock generated in shifting to possibly provide uncomfortable feeling to a driver.

Therefore, in this embodiment, an integral term I in the feedback control when the transmission 4 is switched from the upshift (the first shift) to the downshift (the second shift) is operated in the following method.

Figure 2:
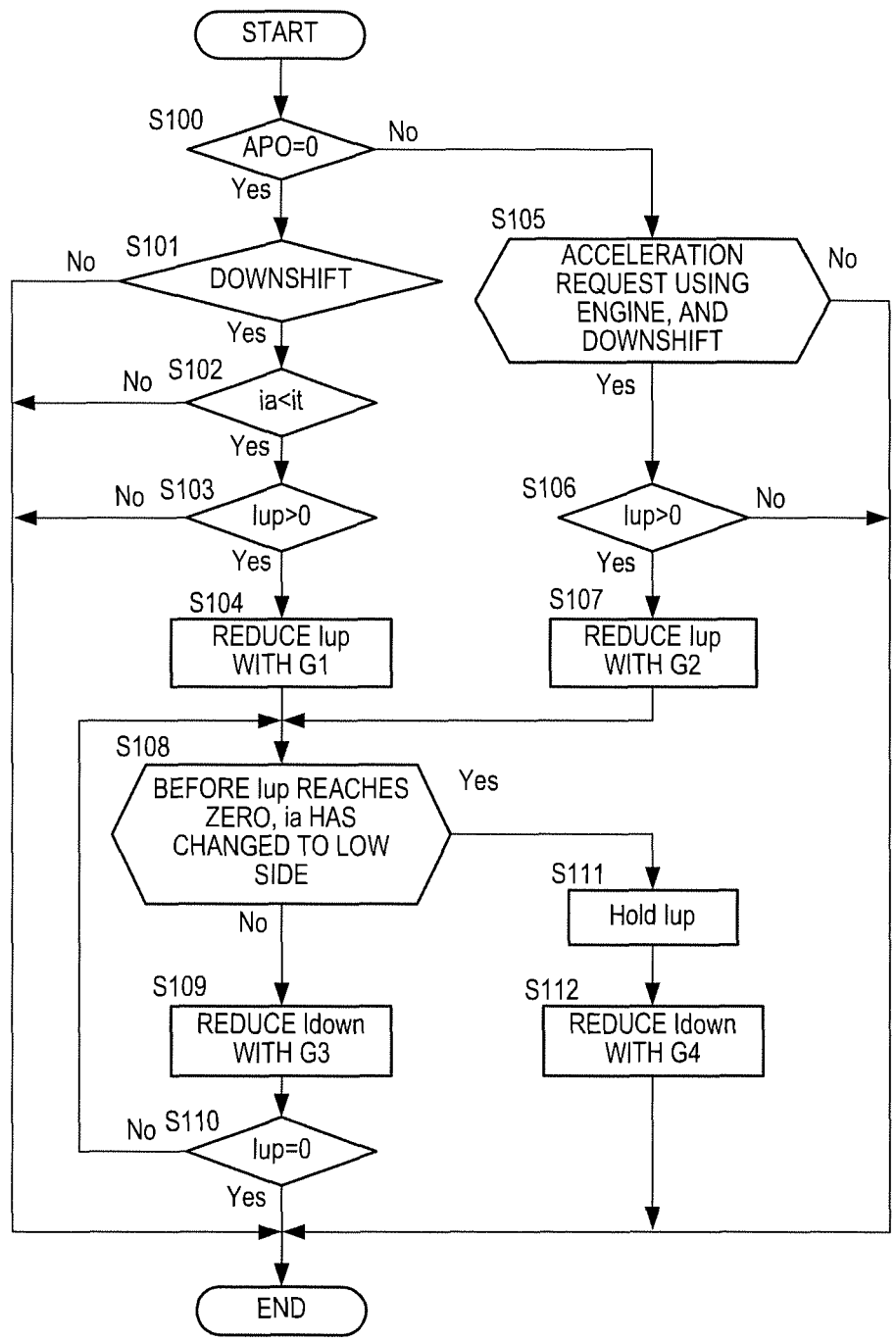
FIG. 2 is a flowchart describing an operation method of an integral term of the embodiment.

The operation method of the integral term I is described by referring to a flowchart in FIG. 2. The following operation is repeatedly performed in a predetermined short period.

At Step S100, the CVT control unit 81 determines whether an accelerator pedal is pressed. The CVT control unit 81 determines that the accelerator pedal is not pressed when an accelerator position APO is zero based on a signal from the accelerator position sensor 85. When the accelerator pedal is not pressed, the process proceeds to Step S101. When the accelerator pedal is pressed, the process proceeds to Step S105.

At Step S101, the CVT control unit 81 determines whether a shift command of the downshift is output.

Figure 3:
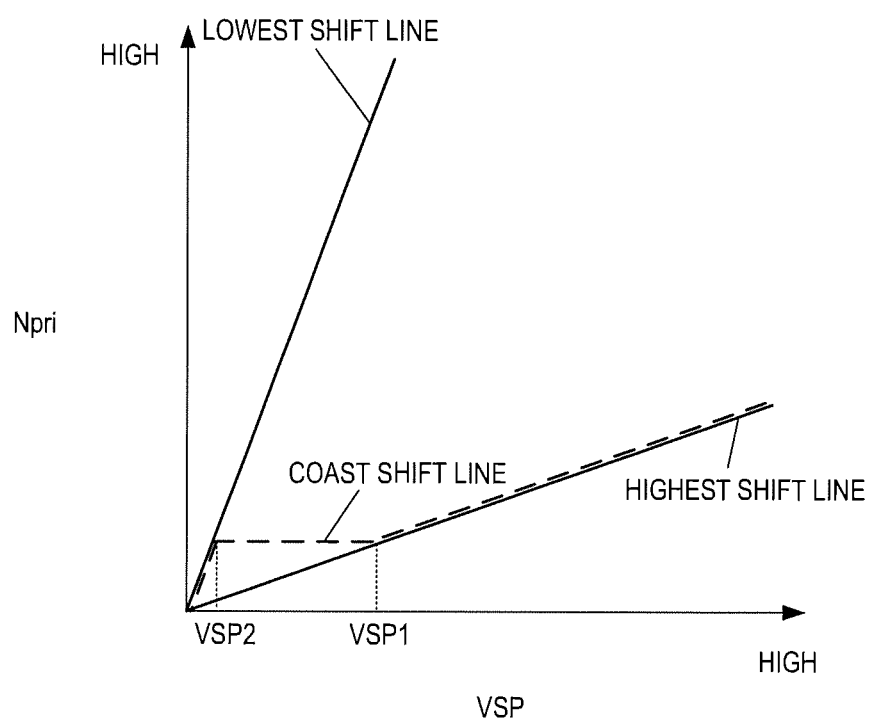
FIG. 3 is a map illustrating a shift map.

In the transmission 4, the shift is performed based on a shift map illustrated in FIG. 3. In this shift map, an operating point of the transmission 4 is defined by a vehicle speed VSP and a primary rotation speed Npri. A gradient of a line that couples the operating point of the transmission 4 to a zero point at a lower-left corner of the shift map corresponds to a speed ratio of the transmission 4. The transmission 4 can shift between a Lowest shift line and a Highest shift line illustrated in FIG. 3. In this shift map, although not illustrated in detail, a shift line is set per the accelerator position APO. The shift of the transmission 4 is performed in accordance with the shift line selected corresponding to the accelerator position APO. In the shift map, a coast shift line is set as a shift line when the accelerator pedal is not pressed (the accelerator position APO=0). The coast shift line matches the Highest shift line when the vehicle speed VSP is equal to or more than a first predetermined vehicle speed VSP1. The coast shift line matches the Lowest shift line when the vehicle speed VSP is equal to or less than a second predetermined vehicle speed VSP2 that is lower than the first predetermined vehicle speed VSP1. In FIG. 3, the coast shift line is indicated with a dashed line. When the coast shift line matches the Lowest shift line or the Highest shift line, the coast shift line is shifted to be indicated for explanation.

When the accelerator pedal is not pressed, the target speed ratio it of the transmission 4 is set such that the actual speed ratio ia of the transmission 4 changes along the coast shift line. When the vehicle speed VSP is equal to or more than the first predetermined vehicle speed VSP1, and the coast shift line matches the Highest shift line, the target speed ratio it is set to the High side with respect to the Highest speed ratio such that the actual speed ratio ia is not displaced off the Highest speed ratio caused by variation or the like. That is, the Highest side speed ratio (what is called a mechanical High speed ratio) that can be obtained as hardware is different per unit by manufacturing variation and the like. Thus, the speed ratio when the variation is at the Highest side is set to the target speed ratio it, and the actual speed ratio ia is set to the High side as much as possible to improve fuel efficiency. However, as described above, at some units, the mechanical High speed ratio is at the Low side with respect to the target speed ratio it caused by the variation. In this case, in a region where the coast shift line matches the Highest shift line, the shift command of the upshift is constantly output to the transmission 4 in order to make the actual speed ratio ia the target speed ratio it, and the upside integral term Iup is accumulated.

Then, when the vehicle speed VSP decreases to be lower than the first predetermined vehicle speed VSP1, the target speed ratio it set to further High side with respect to the Highest speed ratio is changed to the Low side to output the shift command of the downshift.

At Step S101, when it is determined that the shift command of the downshift has been output, the process proceeds to Step S102. When it is determined that the shift command of the downshift has not been output, the process in this time terminates.

At Step S102, the CVT control unit 81 determines whether the target speed ratio it has turned to the Low side with respect to the actual speed ratio ia. The CVT control unit 81 determines that the target speed ratio it has turned to the Low side with respect to the actual speed ratio ia when the target speed ratio it is changed to the Low side, and the target speed ratio it is larger than the actual speed ratio ia. When the target speed ratio it has turned to the Low side with respect to the actual speed ratio ia, the process proceeds to Step S103. When the target speed ratio it has not turned to the Low side with respect to the actual speed ratio ia, the process in this time terminates.

When the CVT control unit 81 determines that the shift command of the downshift has been output at Step S101, and the target speed ratio it has turned to the Low side with respect to the actual speed ratio ia at Step S102, the CVT control unit 81 determines that a condition that resets the upside integral term Iup (a switch condition from the upshift (the first shift) to the downshift (the second shift)) has been satisfied. That is, the CVT control unit 81 determines that the operating state of the transmission 4 has been changed from an operating state based on the Highest shift line to an operating state based on the coast shift line. Thus, the process proceeds to Step S103.

At Step S103, the CVT control unit 81 determines whether the upside integral term Iup is larger than zero. In this embodiment, when the upside integral term Iup is accumulated, the upside integral term Iup is indicated by a positive value. On the other hand, when the downside integral term Idown is accumulated, the downside integral term Idown is indicated by a negative value. That is, the larger an absolute value of the downside integral term Idown is, the larger an accumulate amount of the downside integral term Idown is. When the upside integral term Iup is larger than zero, the process proceeds to Step S104. When the upside integral term Iup is zero, the process in this time terminates.

At Step S104, the CVT control unit 81 stores the upside integral term Iup when the condition that resets the upside integral term Iup has been satisfied for the first time, sets a first predetermined gradient G1 where the stored upside integral term Iup reaches zero at a first predetermined time T1, and gradually reduces the upside integral term Iup with the first predetermined gradient G1. The first predetermined time T1 is preliminary set, and set so as to restrain the provision of the uncomfortable feeling to the driver caused by the rapid reduction of the upside integral term Iup when the upside integral term Iup is reduced.

When it is determined that the accelerator pedal is pressed at Step S100, the CVT control unit 81 determines whether the operation mode has been changed from the EV mode to the HEV mode, and a starting command of the engine 1 and the shift command of the downshift have been output at Step S105. That is, the CVT control unit 81 determines whether the accelerator pedal has been pressed, and an acceleration request using torque generated by the engine 1 and the shift command of the downshift have been output. When the acceleration request from the engine 1 and the shift command of the downshift have been output, the process proceeds to Step S106. When the acceleration request from the engine 1 or the shift command of the downshift has not been output, the process in this time terminates.

At Step S106, the CVT control unit 81 determines whether the upside integral term Iup is larger than zero. When the upside integral term Iup is larger than zero, the process proceeds to Step S107. When the upside integral term Iup is zero, the process in this time terminates.

At Step S107, the CVT control unit 81 stores the upside integral term Iup when the condition that resets the upside integral term Iup has been satisfied for the first time, sets a second predetermined gradient G2 where the stored upside integral term Iup reaches zero at a second predetermined time T2, and gradually reduces the upside integral term Iup with the second predetermined gradient G2. The second predetermined time T2 is shorter than the first predetermined time T1. The second predetermined gradient G2 is smaller than the first predetermined gradient G1 (A decreased amount per unit time based on the second predetermined gradient G2 is larger than a decreased amount per unit time based on the first predetermined gradient G1.). That is, here, a decrease rate of the upside integral term Iup (the decreased amount per unit time) is larger than a decrease rate at Step S104. If a certain upside integral term Iup is reduced with the second predetermined gradient G2, the upside integral term Iup reaches zero faster than a case where the upside integral term Iup is reduced with the first predetermined gradient G1.

At Step S108, the CVT control unit 81 determines whether the actual speed ratio ia has been changed from the Highest speed ratio to the Low side along the coast shift line before the upside integral term Iup reaches zero. Specifically, the CVT control unit 81 determines whether the actual speed ratio ia has turned to the Low side with a predetermined value or more with respect to the target speed ratio it before the upside integral term Iup reaches zero. The predetermined value is a value that can determine that the actual speed ratio ia has changed to the Low side with respect to the Highest speed ratio, and is preliminary set. When the actual speed ratio ia has not changed to the Low side before the upside integral term Iup reaches zero, the process proceeds to Step S109. When the actual speed ratio ia has changed to the Low side before the upside integral term Iup reaches zero, the process proceeds to Step S111.

At Step S109, the CVT control unit 81 gradually reduces the downside integral term Idown with a third predetermined gradient G3. This gradually increases the absolute value of the downside integral term Idown to accumulate the downside integral term Idown. The third predetermined gradient G3 is preliminary set, and set so as to restrain the provision of the uncomfortable feeling to the driver caused by the rapid accumulation of the downside integral term Idown. When this process is performed after the condition that resets the upside integral term has been satisfied for the first time, the CVT control unit 81 starts the operation of the downside integral term Idown. When the process has returned from Step S110, the downside integral term is operated such that the downside integral term Idown reduces with the third predetermined gradient G3. Here, the downside integral term Idown is operated to set a sum of the upside integral term Iup that is being reduced and the operated downside integral term Idown as the integral term I of the integrator.

At Step S110, the CVT control unit 81 determines whether the upside integral term Iup has reached zero and has been reset. Specifically, the CVT control unit 81 determines whether the first predetermined time T1 has passed after the condition that resets the upside integral term Iup had been satisfied for the first time. When the first predetermined time T1 has not passed, and the upside integral term Iup has not been reset, the process returns to Step S109. When the first predetermined time T1 has passed, and the upside integral term Iup has been reset, the process in this time terminates.

When the actual speed ratio ia has changed to the Low side before the upside integral term Iup reaches zero, the CVT control unit 81 terminates the reduction of the upside integral term Iup to hold the current upside integral term Iup at Step S111.

At Step S112, the CVT control unit 81 gradually reduces the downside integral term Idown with a fourth predetermined gradient G4. The fourth predetermined gradient G4 is a value larger than the third predetermined gradient G3 (a decreased amount per unit time based on the fourth predetermined gradient G4 is smaller than a decreased amount per unit time based on the third predetermined gradient G3.), and is preliminary set. That is, an increase rate where the downside integral term Idown is accumulated (the decreased amount per unit time) turns to lower than an increase rate before the integral term I reaches zero. Here, a sum of the held upside integral term Iup and the operated downside integral term Idown is set as the integral term I of the integrator.

Figure 4:
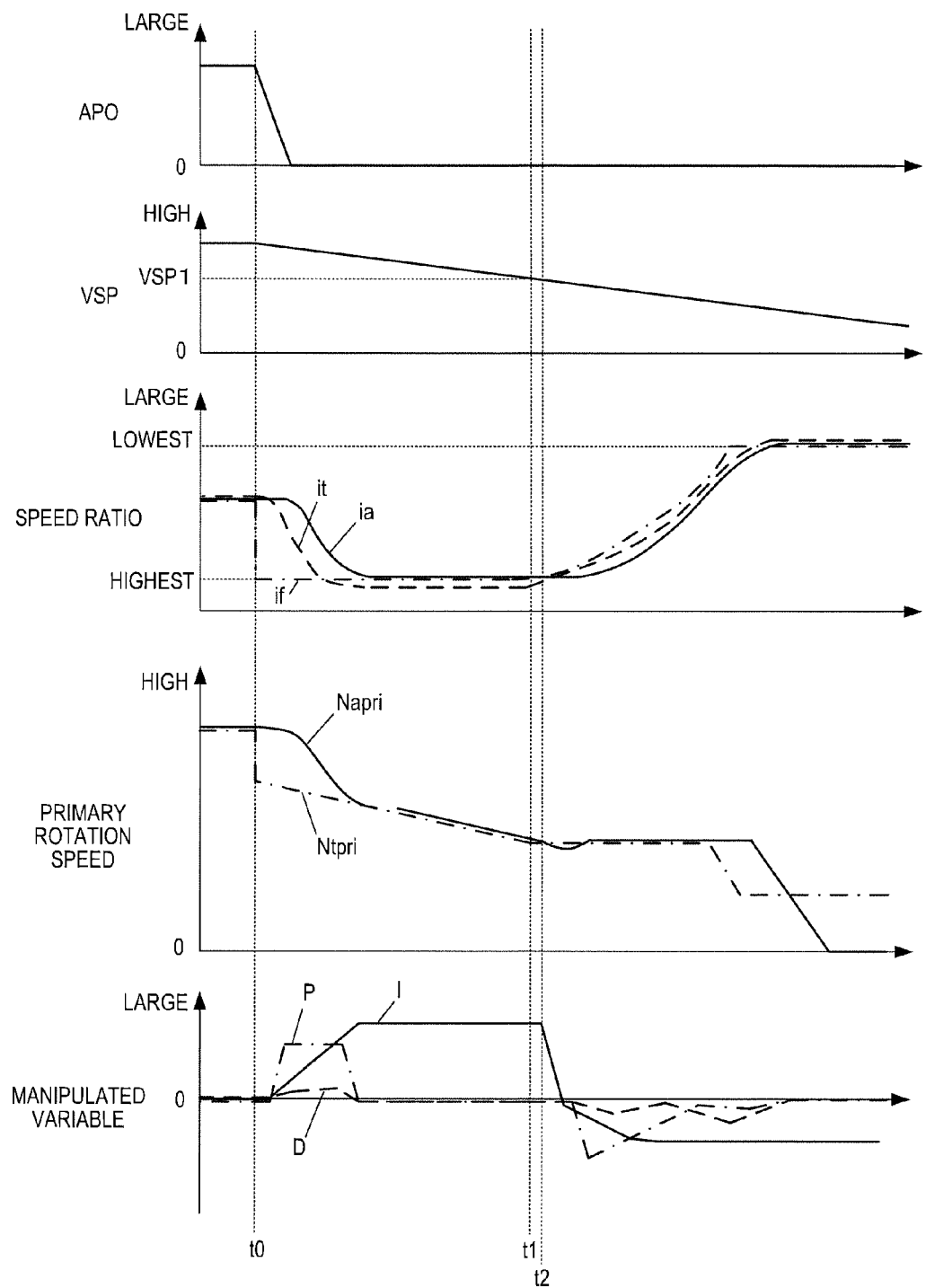
FIG. 4 is a timing chart describing a case where a downshift is performed in coast running.

The following describes a case where the downshift is performed in coast running by referring to a timing chart in FIG. 4. Here, it is assumed that the vehicle is running in a state where the vehicle speed VSP is higher than the first predetermined vehicle speed VSP1.

At a time t0, the accelerator pedal is no longer pressed, and the accelerator position APO reaches zero. This changes the shift line that indicates a final target speed ratio if to the coast shift line (the Highest shift line) stepwisely corresponding to the accelerator position APO. In association with this, the target speed ratio it is gradually changed to be a speed ratio at the High side with respect to the Highest speed ratio along the coast shift line, and the feedback control is performed such that the actual speed ratio ia follows the target speed ratio it to be the Highest speed ratio. Here, respective terms of a proportioner, a differentiator, and the integrator are positive values such that the actual speed ratio ia changes toward the Highest speed ratio. It should be noted that the target speed ratio it is set to the High side with respect to the Highest speed ratio such that the actual speed ratio ia holds the Highest speed ratio even after the actual speed ratio ia has turned to the Highest speed ratio. Thus, the upside integral term Iup is accumulated, and the integral term I is held with the positive value. In the speed ratio in FIG. 4, the final target speed ratio if is indicated by a one dot chain line, the target speed ratio it is indicated by a dashed line, and the actual speed ratio ia is indicated by a solid line. In the manipulated variable in FIG. 4, a proportional term P is indicated by a one dot chain line, a derivative term D is indicated by a dashed line, and the integral term I is indicated by a solid line. In FIG. 4, for explanation, the matching lines are partially shifted to be described. The same applies to the following timing charts.

A target primary rotation speed Ntpri is stepwisely changed in accordance with the final target speed ratio if at the time t0, and thereafter, changed to decrease along the coast shift line in accordance with the reduction of the vehicle speed VSP. An actual primary rotation speed Napri decreases together with the change of the actual speed ratio ia. In the primary rotation speed in FIG. 4, the target primary rotation speed Ntpri is indicated by a one dot chain line, and the actual primary rotation speed Napri is indicated by a solid line.

At a time t1, the vehicle speed VSP becomes lower than the first predetermined vehicle speed VSP1, the shift command of the downshift is output, and the target speed ratio it is changed to be at the Low side with respect to the Highest speed ratio along the coast shift line.

At a time t2, when the target speed ratio it becomes larger than the actual speed ratio ia, and the condition that resets the upside integral term Iup is satisfied, the reduction of the integral term I is started.

Figure 5:
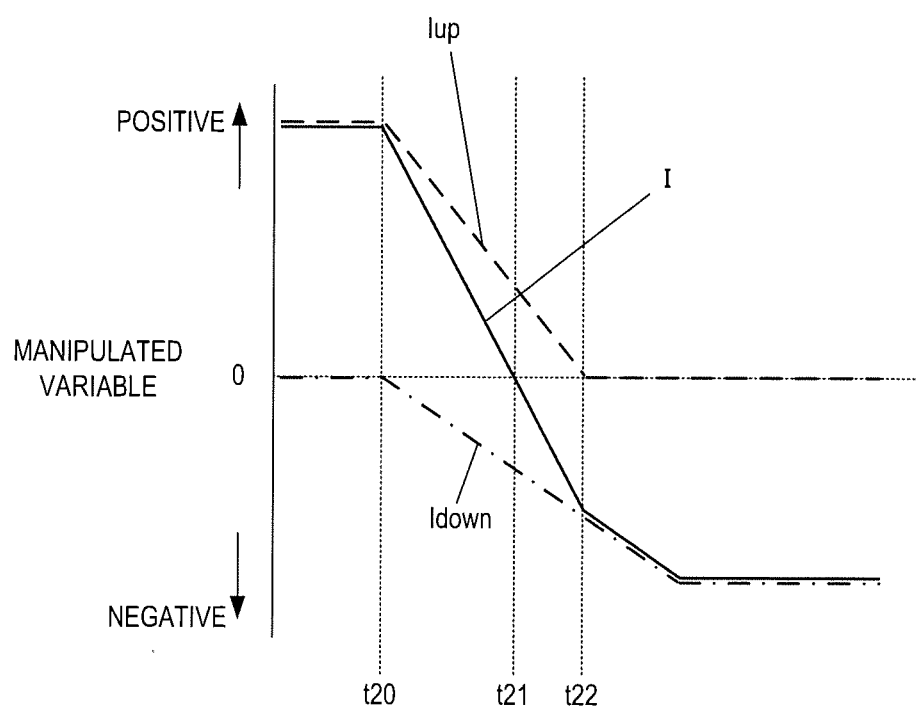
FIG. 5 is a timing chart describing change of the integral term near a time t1 in FIG. 4.

The change of the integral term I at the time t2 will be described by referring to an enlarged view in FIG. 5. In FIG. 5, the upside integral term Iup is indicated by a dashed line, the downside integral term Idown is indicated by a one dot chain line, and the integral term I is indicated by a solid line.

At a time t20, when the condition that resets the upside integral term Iup is satisfied, the reduction of the upside integral term Iup is started. Simultaneously with this, the operation of the downside integral term Idown is started. Since the integral term I is a sum of the upside integral term Iup and the downside integral term Idown, the integral term I is smaller than the upside integral term Iup.

At a time t21, when the integral term I becomes smaller than zero, the downshift is actually started.

At a time t22, when the upside integral term Iup reaches zero, the integral term I matches the downside integral term Idown.

When the embodiment is not used, after the upside integral term Iup reaches zero at the time t22, the operation of the downside integral term Idown is started. Thus, the downshift is actually started at a timing of the time t22.

Thus, in this embodiment, compared with the case where the embodiment is not used, by a portion that the integral term I quickly becomes smaller than zero (the time t22–the time t21), the downshift can be quickly started.

Referring again to FIG. 4, when the vehicle speed VSP becomes lower than the first predetermined vehicle speed VSP1, the target primary rotation speed Ntpri set along the coast shift line becomes constant as illustrated in FIG. 3. However, by influence of the upside integral term Iup, the actual primary rotation speed Napri undershoots with respect to the target primary rotation speed Ntpri. However, using the embodiment ensures reduction of this undershoot since the downshift is quickly started.

Figure 6:
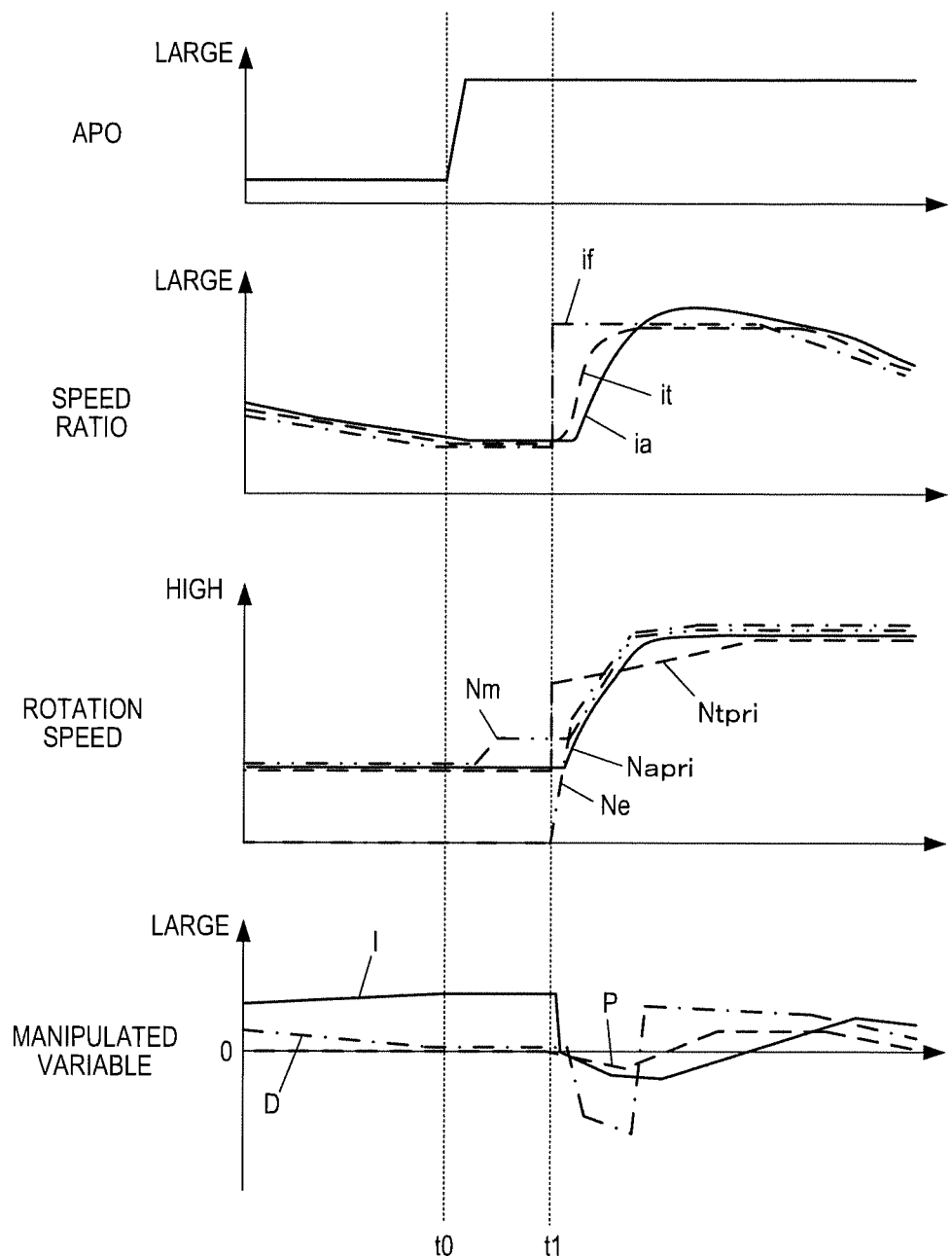
FIG. 6 is a timing chart describing a case where an operation mode is changed from an EV mode, a shift command of the downshift is output and an engine is started.

The following describes a case where the operation mode is changed from the EV mode, and the shift command of the downshift is output to start the engine 1 by referring to a timing chart in FIG. 6. Here, the hybrid vehicle is running in the EV mode while the transmission 4 is performing the upshift along a Road load shift line that is a shift line when driving force required to run at a constant vehicle speed with a constant accelerator position APO is output.

At the time t0, the accelerator pedal is further pressed in the EV mode to increase the accelerator position APO. Thus, the shift command of the downshift is output to determine that the vehicle is run using the torque generated in the engine 1. However, here, the engine 1 has not been started yet, and the second clutch is disengaged on ahead. This makes a motor rotation speed Nm higher than the actual primary rotation speed Napri. Here, disengaging the second clutch without starting the engine 1 is for preventing the torque generated when the engine 1 is started to rev from being transmitted to the transmission 4 and the driving wheels 6. In the rotation speed in FIG. 6, the target primary rotation speed Ntpri is indicated by a dashed line, the actual primary rotation speed Napri is indicated by a solid line, the motor rotation speed Nm is indicated by a two-dot chain line, and the engine rotation speed Ne is indicated by a one dot chain line.

At the time t1, the engine 1 is started, and thereafter, the downshift is started. The first clutch 12 has been disengaged during the EV mode. When the engine 1 is started, the first clutch 12 is engaged, a crankshaft of the engine 1 is rotated by the motor-generator 2, and then fuel injection into the engine 1 is started. After the engine 1 is started, in order to start the downshift, the shift line that indicates the final target speed ratio if is stepwisely changed corresponding to the accelerator position APO, the target speed ratio it is gradually changed, and the feedback control is performed such that the actual speed ratio ia follows the target speed ratio it. The target primary rotation speed Ntpri is also stepwisely changed according to the final target speed ratio if. In the speed ratio in FIG. 6, the final target speed ratio if is indicated by a one dot chain line, the target speed ratio it is indicated by a dashed line, and the actual speed ratio ia is indicated by a solid line.

After the engine 1 is started, in order to perform the downshift, the upside integral term Iup is reduced with the second predetermined gradient G2. When the downshift is started in a state where the second clutch has been engaged before the engine 1 is started, the motor rotation speed Nm increases according to the downshift, and the torque that rotates the crankshaft of the engine 1 decreases. This possibly cannot start the engine 1. Therefore, in this embodiment, after the engine 1 is started, the reduction of the upside integral term Iup is started. That is, even if the shift command of the downshift is output, the upside integral term Iup does not reduce until the engine 1 is started, thus restricting the start of the downshift.

After the engine 1 is started, the upside integral term Iup is reduced with the second predetermined gradient G2 smaller than the first predetermined gradient G1. After the integral term I becomes smaller than zero, the actual speed ratio ia increases following the target speed ratio it to start the downshift. Thus, although the start of the downshift is restricted, reducing the upside integral term Iup with the second predetermined gradient G2 smaller than the first predetermined gradient G1 ensures improvement of the responsiveness of the downshift.

Figure 7:
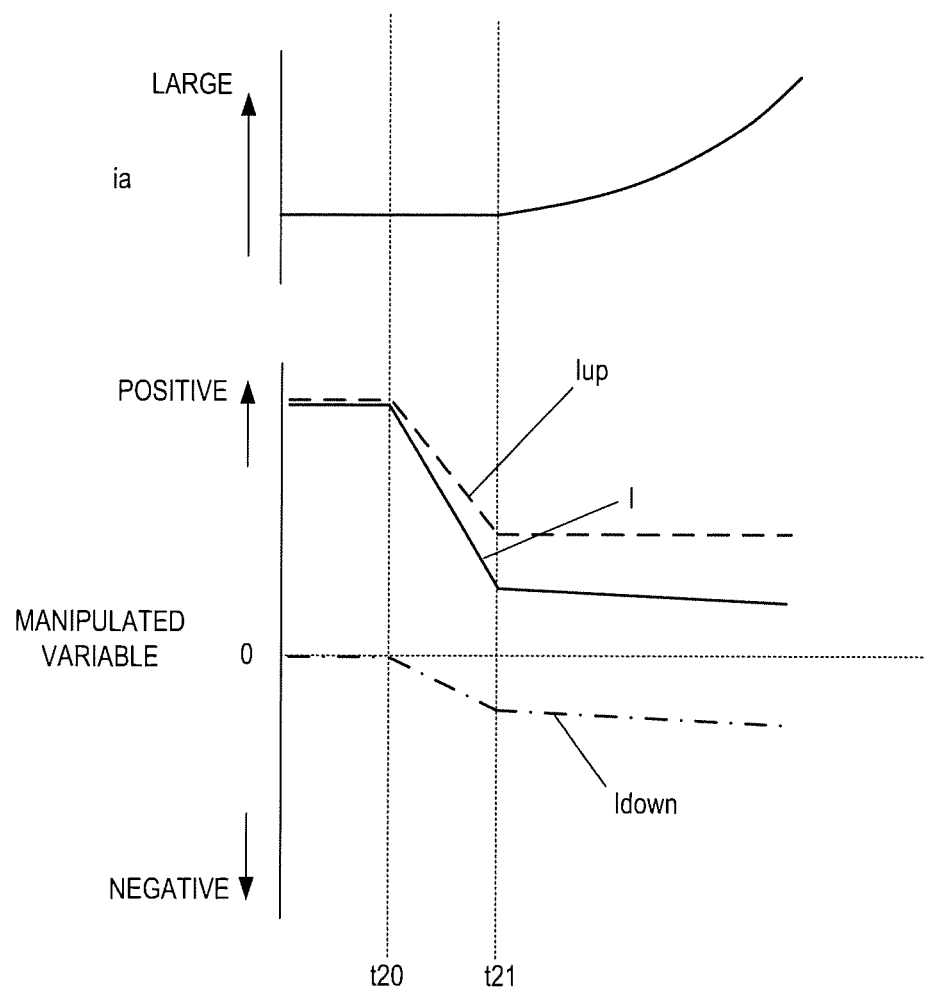
FIG. 7 is a timing chart describing a case where an actual speed ratio has changed to a Low side before the integral term becomes smaller than zero.

The following describes a case where the actual speed ratio ia has changed to the Low side before the integral term I becomes smaller than zero by referring to a timing chart in FIG. 7. Here, the change of the integral term I near the time t2 in FIG. 4 is mainly described.

At the time t20, the reduction of the upside integral term Iup is started. Simultaneously with this, the operation of the downside integral term Idown is started.

At the time t21, when the actual speed ratio ia has changed to the Low side before the integral term I reaches zero, the upside integral term Iup is held at the upside integral term Iup when the actual speed ratio ia has changed to the Low side. The downside integral term Idown reduces with the fourth predetermined gradient G4. The integral term I turns to a sum of the held upside integral term Iup and the operated downside integral term Idown.

Sometimes the actual speed ratio ia has changed to the Low side before the integral term I reaches zero, for example, by product variation of the transmission 4 or gain setting in the PID control, thus actually starting the downshift. That is, the downshift is sometimes started before a timing when the integral term I becomes lower than zero. In such case, if the upside integral term Iup is further decreased, and the downside integral term Idown is reduced with the third predetermined gradient G3, the downshift is started before the intended timing, and in addition, the downshift becomes excessive. In this embodiment, the upside integral term Iup is held, and the downside integral term Idown is reduced with the fourth predetermined gradient G4 larger than the third predetermined gradient G3, thus restraining the excessive downshift.

A description will be given of advantageous effects according to the embodiment of the present invention.

When the upshift is switched to the downshift, from the satisfaction of the condition that resets the upside integral term Iup to the time when the upside integral term Iup reaches zero, the operation of the downside integral term Idown is started, and the transmission 4 is controlled based on the sum of the upside integral term Iup and the downside integral term Idown. This ensures the improvement of the responsiveness of the downshift.

The upside integral term Iup is reduced not stepwisely but gradually with the first predetermined gradient G1, thus restraining the rapid switch from the upshift to the downshift from being generated. This can restrain the provision of the uncomfortable feeling to the driver.

The operation of the downside integral term Idown is started simultaneously with the satisfaction of the condition that resets the upside integral term Iup. Thus, the operation of the downside integral term Idown is started at the fastest timing that can determine transferring to the downshift, thus ensuring the improvement of the responsivity of the downshift.

In the coast running, when the vehicle speed VSP is higher than the first predetermined vehicle speed VSP1, in order to hold the actual speed ratio ia at the Highest speed ratio, the target speed ratio it is set at the High side with respect to the Highest speed ratio, thus accumulating the upside integral term Iup. From this state, when the vehicle speed VSP becomes lower than the first predetermined vehicle speed VSP1, the shift command of the downshift is always output such that the actual speed ratio ia changes along the coast shift line that does not match the Highest shift line.

In this embodiment, in the coast running, the operation of the downside integral term Idown is started at an identical time when the vehicle speed VSP becomes lower than the first predetermined vehicle speed VSP1, and the operating state of the transmission 4 is changed from the operating state based on the Highest shift line to the operating state based on the coast shift line. This ensures the improvement of the responsiveness of the downshift.

In the hybrid vehicle of the embodiment, the first clutch 12 is disposed between the engine 1 and the motor-generator 2, and the second clutch is disposed between the motor-generator 2 and the transmission 4. Then, the oil pump 70 is disposed between the motor-generator 2 and the second clutch. In such hybrid vehicle, when the regeneration is being performed in the motor-generator 2 in the coast running, if the rotation speed of the oil pump 70 becomes equal to or less than a predetermined rotation speed, or the vehicle speed VSP becomes equal to or less than a certain vehicle speed VSP, the second clutch is disengaged to terminate the regeneration by the motor-generator 2. This is because an amount of oil discharged from the oil pump 70 possibly falls below the smallest amount of oil where a slip does not occur in the respective clutches and the transmission 4. It should be noted that, in such case, the oil pump 70 is driven by the engine 1 such that the amount of oil does not fall below the smallest amount of oil. When the vehicle speed VSP becomes lower than the first predetermined vehicle speed VSP1 in the coast running, and the coast shift line becomes not to match the Highest shift line, if the change timing from the upshift to the downshift gets delayed, the actual primary rotation speed Napri decreases, and the rotation speed of the oil pump 70 becomes equal to or less than the predetermined rotation speed, thus possibly terminating the regeneration by the motor-generator 2. This reduces a regeneration amount by the motor-generator 2, and increases a frequency that the engine 1 is driven to run, thus becoming less able to improve the fuel efficiency.

Not in the above-described hybrid vehicle, but in a vehicle including only an engine, in order to avoid influence by sound and vibration, the coast shift line is set to an upper side (a high rotation speed side of the primary rotation speed Npri) with respect to the coast shift line in FIG. 3, or a gradient is largely set. Therefore, the rotation speed of an oil pump does not become equal to or less than the predetermined rotation speed in the coast running as described above. However, in the above-described hybrid vehicle, since the engine 1 becomes a load viewing from the motor-generator 2 in regeneration in the coast running, it is preferably for improving the fuel efficiency to perform the regeneration by the motor-generator 2 in a state where the engine rotation speed Ne is low. Therefore, compared with the vehicle including only the engine, the coast shift line is set to a lower side (a low rotation speed side of the primary rotation speed Npri).

Accordingly, as described above, when the vehicle speed VSP decreases in the coast running, and the coast shift line becomes not to match the Highest shift line, if the change timing from the upshift to the downshift gets delayed, the actual primary rotation speed Napri decreases, and the rotation speed of the oil pump 70 becomes equal to or less than the predetermined rotation speed, thus possibly terminating the regeneration by the motor-generator 2. In this embodiment, the improvement of the responsiveness of the downshift prevents the rotation speed of the oil pump 70 from becoming equal to or less than the predetermined rotation speed, and prevents the regeneration amount by the motor-generator 2 from reducing, thus ensuring the improvement of the fuel efficiency.

The decreased amount per unit time of the upside integral term Iup when the condition that resets the upside integral term Iup has been satisfied based on the acceleration request from the driver is made larger than the decreased amount per unit time of the upside integral term Iup when the condition that resets the upside integral term Iup has been satisfied caused by the reduction of the vehicle speed VSP in the coast running. That is, the upside integral term Iup when the acceleration request from the driver exists is reduced faster than the upside integral term Iup in the coast running. This can accelerate the start timing of the downshift when the acceleration request from the driver exists, thus ensuring the improvement of the responsiveness of the downshift. When the downshift is performed by starting the engine 1 from the EV mode, in order to start the engine 1 by the motor-generator 2, the start of the downshift is sometimes restricted until the engine 1 is started. Especially, in such case, the decreased amount per unit time of the upside integral term Iup is increased to ensure the improvement of the responsiveness of the downshift.

When the actual speed ratio ia has changed to the Low side before the integral term I, which is the sum of the upside integral term Iup and the downside integral term Idown, reaches zero, and the downshift has been actually started, the upside integral term Iup when the actual speed ratio ia has changed to the Low side is held. This can restrain the excessive downshift to restrain the uncomfortable feeling provided to the driver even when the downshift is actually started before the intended timing.

When the actual speed ratio ia has changed to the Low side before the integral term I, which is the sum of the upside integral term Iup and the downside integral term Idown, reaches zero, and the downshift is actually started, the downside integral term Idown is accumulated with the fourth predetermined gradient G4 larger than the third predetermined gradient G3 before the integral term I reaches zero, that is, at the increase rate lower than that before the integral term I reaches zero. This can restrain the excessive downshift to restrain the uncomfortable feeling provided to the driver even when the downshift is actually started before the intended timing.

The embodiment of the present invention described above is merely illustration of some application examples of the present invention and not of the nature to limit the technical scope of the present invention to the specific constructions of the above embodiment.

It is only necessary that the operation of the downside integral term Idown according to the embodiment is started after the condition that resets the upside integral term Iup is satisfied and before the upside integral term Iup reaches zero. The satisfaction of the condition that resets the upside integral term Iup may be determined by the output of the shift command of the downshift.

While the above-described embodiment has described the case where the upshift is switched to the downshift. However, similarly in a case where the downshift is switched to the upshift, the operation of the upside integral term Iup may be started before the downside integral term Idown reaches zero. For example, in order to make the actual speed ratio ia the Lowest speed ratio, the target speed ratio it is set to the Low side with respect to the Lowest speed ratio such that the actual speed ratio ia is not displaced off to the High side from the Lowest speed ratio. That is, the Lowest side speed ratio (what is called a mechanical Low speed ratio) that can be obtained as hardware is different per unit by manufacturing variation and the like. Thus, the speed ratio when the variation is at the Lowest side is set to the target speed ratio it, and the actual speed ratio ia is set to the Low side as much as possible to prevent driving force shortage. However, as described above, at some units, the mechanical Low speed ratio is at the High side with respect to the target speed ratio it caused by the variation. In this case, the shift command of the downshift is constantly output to the transmission 4 in order to make the actual speed ratio ia the target speed ratio it, and the downside integral term Idown is accumulated. Therefore, when the shift command of the upshift is output from a state where the actual speed ratio ia is Lowest, the downside integral term Idown is accumulated. When the operation of the upside integral term Iup is started after the downside integral term Idown reaches zero, the responsiveness of the upshift decreases. In contrast, the embodiment ensures the improvement of the responsiveness of the upshift.

While in the above-described embodiment, the acceleration request from the driver is determined corresponding to the accelerator position APO. However, other than this, the acceleration request from the driver may be determined based on a shift lever operation and a paddle switch operation.

The present application claims a priority of Japanese Patent Application No. 2015-59513 filed with the Japan Patent Office on Mar. 23, 2015, all the contents of which are hereby incorporated by reference.

The invention claimed is:

1. A control device for a continuously variable transmission that performs feedback control to control an operating state of the continuously variable transmission, the control device comprising
a controller configured to, when a switch condition where a shift of the continuously variable transmission is switched from a first shift that is any one of an upshift and a downshift to another second shift is satisfied, reduce an integral term in a feedback control of the first shift to zero with a first predetermined gradient, start an operation of an integral term in a feedback control of the second shift after the switch condition is satisfied and before the integral term in the feedback control of the first shift reaches zero, and shift the continuously variable transmission based on a sum of the integral term in the feedback control of the first shift and the integral term in the feedback control of the second shift.

2. The control device for the continuously variable transmission according to claim 1, wherein
the controller is configured to start the operation of the integral term in the feedback control of the second shift simultaneously with the satisfaction of the switch condition.

3. The control device of the continuously variable transmission according to claim 2, wherein
the controller is configured to: set a target speed ratio to a High side with respect to a Highest speed ratio in coast running when a vehicle speed is a vehicle speed where a Highest shift line of the continuously variable transmission matches a coast shift line selected in the coast running, and start the operation of the integral term in the feedback control of the second shift at an identical time when the operating state is changed from an operating state based on the Highest shift line to an operating state based on the coast shift line in accordance with decrease of the vehicle speed in the coast running.

4. The control device for the continuously variable transmission according to claim 2, wherein
a decreased amount per unit time of the integral term in the feedback control of the first shift when the switch condition is satisfied based on an acceleration request from a driver during the upshift is larger than a decreased amount per unit time in the feedback control of the first shift when the operating state is changed from an operating state based on a Highest shift line to an operating state based on a coast shift line in accordance with decrease of a vehicle speed in coast running.

5. The control device for the continuously variable transmission according to claim 1, wherein
the controller is configured to hold the integral term in the feedback control of the first shift at the time of start of the second shift when the second shift has been started before the sum of the integral term in the feedback control of the first shift and the integral term in the feedback control of the second shift indicates a shift to a side of the second shift.

6. The control device of the continuously variable transmission according to claim 1, wherein
the controller is configured to make an increase rate of the integral term in the feedback control of the second shift lower than an increase rate before a shift to a side of the second shift is indicated when the second shift has been started before the sum of the integral term in the feedback control of the first shift and the integral term in the feedback control of the second shift indicates the shift to the side of the second shift.

7. A control method of a continuously variable transmission that performs feedback control to control an operating state of the continuously variable transmission, the control method comprising:
when a switch condition where a shift of the continuously variable transmission is switched from a first shift that is any one of an upshift and a downshift to another second shift is satisfied,
reducing an integral term in a feedback control of the first shift to zero with a first predetermined gradient;
starting an operation of an integral term in a feedback control of the second shift after the switch condition is satisfied and before the integral term in the feedback control of the first shift reaches zero; and
shifting the continuously variable transmission based on a sum of the integral term in the feedback control of the first shift and the integral term in the feedback control of the second shift.

8. A control device for a continuously variable transmission that performs feedback control to control an operating state of the continuously variable transmission, the control device comprising
shift means for, when a switch condition where a shift of the continuously variable transmission is switched from a first shift that is any one of an upshift and a downshift to another second shift is satisfied, reducing an integral term in a feedback control of the first shift to zero with a first predetermined gradient, starting an operation of an integral term in a feedback control of the second shift after the switch condition is satisfied and before the integral term in the feedback control of the first shift reaches zero, and shifting the continuously variable transmission based on a sum of the integral term in the feedback control of the first shift and the integral term in the feedback control of the second shift.

* * * * *